United States Patent [19]

Amano

[11] 4,027,639
[45] June 7, 1977

[54] ISOTHERMAL FUEL SUPPLY SYSTEM

[75] Inventor: Masuo Amano, Okazaki, Japan

[73] Assignee: Toyota Jidosha Kogyo Kabushiki Kaisha, Toyota, Japan

[22] Filed: June 23, 1975

[21] Appl. No.: 589,596

Related U.S. Application Data

[63] Continuation-in-part of Ser. No. 555,265, March 4, 1975, abandoned.

[30] Foreign Application Priority Data

Oct. 23, 1974  Japan .............................. 49-122225

[52] U.S. Cl. .............................. 123/122 E; 123/133
[51] Int. Cl.² .......................................... F02M 31/00
[58] Field of Search .......... 123/122 E, 122 H, 133, 123/41.31; 165/51, 52; 261/144

[56] References Cited

UNITED STATES PATENTS

| | | | |
|---|---|---|---|
| 1,168,111 | 1/1916 | Pope | 123/122 E |
| 1,300,600 | 4/1919 | Giesler | 123/122 E |
| 1,318,068 | 10/1919 | Giesler | 123/122 E |
| 1,822,147 | 9/1931 | Horning | 123/122 A |
| 3,110,296 | 11/1963 | Lundi | 123/122 E |
| 3,253,647 | 5/1966 | Deshaies | 123/122 E |
| 3,354,872 | 11/1967 | Gratzmuller | 123/122 E |

FOREIGN PATENTS OR APPLICATIONS

| | | | |
|---|---|---|---|
| 898,623 | 10/1943 | France | 261/144 |
| 49,181 | 3/1931 | Norway | 261/144 |

Primary Examiner—Ronald H. Lazarus
Attorney, Agent, or Firm—Birch, Stewart, Kolasch and Birch

[57] ABSTRACT

A fuel supply system which preheats fuel to be supplied to a carburetor or a fuel injection device up to a constant temperature regardless of variations in engine operating condition, wherein a part of a fuel supply tube which extends from a fuel pump to the carburetor or the fuel injection device is put into contact with engine cooling water in a heat exchanging manner.

1 Claim, 3 Drawing Figures

ISOTHERMAL FUEL SUPPLY SYSTEM

This is a continuation-in-part application of Ser. No. 555,265, filed on Mar. 4, 1975 now abandoned.

BACKGROUND OF THE INVENTION

1. Field of the Invention

The present invention relates to a fuel supply system of an engine for an automobile, etc.

2. Description of the Prior Art

In order to obtain better ignition and higher efficiency of combustion, it is desirable that fuel which is supplied to an engine is preheated up to a proper temperature. Needless to say, preheating of fuel is much more desirable in an engine of an automobile, etc., which is operated in a cold environment. However, if fuel is heated excessively in a tube which extends from a fuel pump to a carburetor or a fuel injection device, there is a danger that vapour lock will occur in the tube, causing interruption of fuel supply. In order to preheat fuel supplied to an engine up to a predetermined temperature, the usual practice is to employ an electric heater equipped with temperature control means. However, since a common electric heater controlled by a thermostat or the like generally operates with relatively wide fluctuations in the controlled temperature and, in addition, the flow of fuel which passes through the heater violently changes according to operating condition of an automobile, it is very difficult to maintain a constant predetermined preheating temperature of the fuel which reaches a carburetor or a fuel injection device.

SUMMARY OF THE INVENTION

Therefore, it is an object of the present invention to provide an isothermal fuel supply system which can supply fuel to a carburetor or a fuel injection device constantly at a stably maintained preheated temperature regardless of changes in the operating condition of an automobile or an engine.

According to the present invention, the abovementioned object is accomplished by an isothermal fuel supply system comprising a fuel supply tube which extends from a fuel pump to a carburetor or a fuel injection device, a part of said tube being put into contact with engine cooling water in a heat exchanging manner.

Engine cooling water, especially the cooling water which has left a radiator, is stably maintained at a determined relatively low temperature regardless of the operating temperature of an automobile or an engine, after the engine has been warmed up. Furthermore, the amount of engine cooling water is much larger than the fuel to be preheated. In other words, the heat capacity of engine cooling water as a heat source for heating fuel is large enough to absorb variations in the flow of fuel supplied to the engine due to violent changes of engine operating conditions and to maintain the preheating temperature of fuel at a constant level. Therefore, by putting a part of a fuel supply tube which extends from a fuel pump to a carburetor or a fuel injection device into contact with engine cooling water in a heat exchanging manner, it is possible to maintain the preheating temperature of the fuel supplied to the carburetor or the fuel injection device substantially constant at a predetermined temperature.

According to a particular feature of the present invention, the aforementioned contact of a part of the fuel supply tube with engine cooling water in a heat exchanging manner may be accomplished by leading said part of tube through a bottom tank of a radiator. The bottom tank of the radiator is filled with a relatively large amount of water which has passed through the radiator and is maintained at a constant relatively low temperature. Therefore, by leading a part of the fuel supply tube through the bottom tank, the fuel is moderately heated by a heat source having a constant temperature and a large capacity up to a constant relatively low temperature which will never cause vapour lock, regardless of variations in the flow of fuel.

Alternatively, according to another particular feature of this invention, a part of the fuel supply tube may be passed through a heat exchanger which is also circulated by engine cooling water which has left a radiator.

In either of the two constitutions mentioned above, a particular temperature control means is not required to control the preheating temperature of the fuel. Nevertheless, there is no danger that fuel is overheated so as to cause vapour lock, except in a particular situation such that the radiator has gone wrong and the cooling water has been heated up to so high a temperature that the engine needs to be stopped.

BRIEF DESCRIPTION OF THE DRAWING

In the accompanying drawing.

DESCRIPTION OF THE PREFERRED EMBODIMENT

Figure 1:
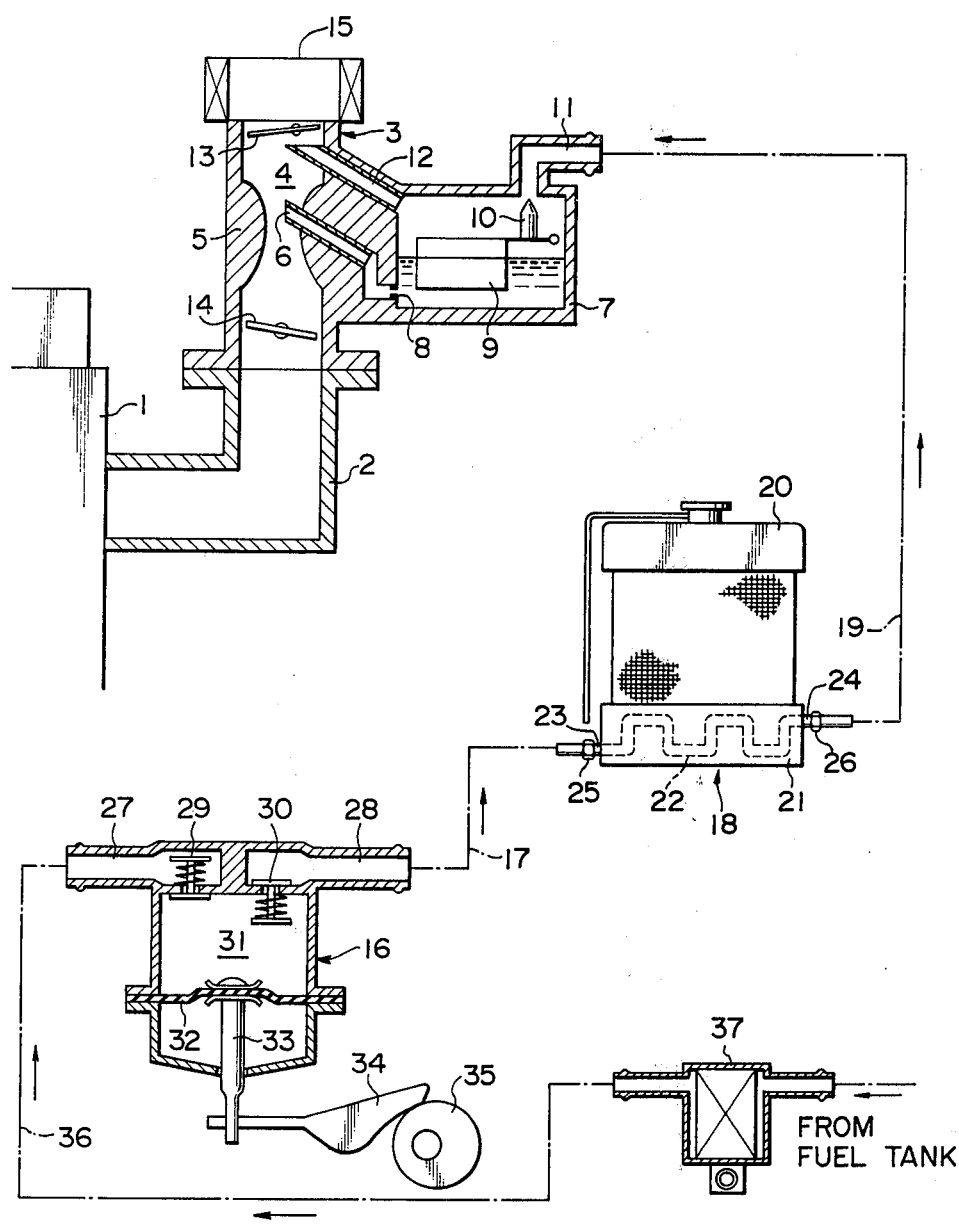
FIGS. 1 and 2 are diagrammatical views showing two embodiments of the isothermal fuel supply system according to this invention.

Referring to FIG. 1, element 1 designates an engine equipped with an intake manifold 2 which is connected with a carburetor generally designated by 3. The carburetor 3 may be of any conventional structure which comprises an intake air passage 4 connecting to the intake manifold 2, said passage being formed with a Venturi portion 5 at a portion thereof, at which a main nozzle 6 opens. The main nozzle 6 is supplied with fuel stored in a float chamber 7 through a main jet 8. Within the float chamber 7 is provided a float 9 which operates a needle valve 10 to control the amount of fuel which flows into the float chamber through a fuel inlet 11 so that a predetermined level of fuel is constantly maintained in a float chamber 7. Element 12 designates an air vent which discharges fuel vapour generated in the float chamber toward an inlet portion of the intake air passage 4. Within the intake air passage 4, a choke valve 13 is provided upstream of the Venturi portion 5 while a throttle valve 14 is provided downstream of the Venturi portion. Element 15 designates an air cleaner which purifies air to be supplied to the carburetor.

The fuel inlet 11 of the carburetor is supplied with fuel which is delivered by a fuel pump 16 and transferred through a conduit 17, a heat exchanger 18 provided according to the present invention and a conduit 19. The heat exchanger 18 is composed of a bottom tank 21 provided at a bottom portion of a radiator 20 and a conduit, preferably a meandering tube 22 mounted in the bottom tank. The conduit 22 is assembled beforehand with the radiator bottom tank 21 thereby providing stud portions 23 and 24 at opposite ends for connection with the conduit 17 and 19 by means of proper tube connecting lock nuts 25 and 26. The fuel pump 16 in the shown embodiment comprises an inlet port 27 and an outlet port 28, these inlet and outlet ports being connected with a diaphragm chamber 31 through check valves 29 and 30. An end of the diaphragm chamber 31 is defined by a diaphragm 32 which is connected to and driven by an actuating rod 33, which in turn is driven by a cam 35 through a cam follower element 34. The cam 35 is rotated by the engine. Fuel supplied to the inlet port 27 of the fuel pump 16 is drawn from a fuel tank (not shown) through a conduit 36 and a filter 37 provided in the way of the conduit.

Figure 2:
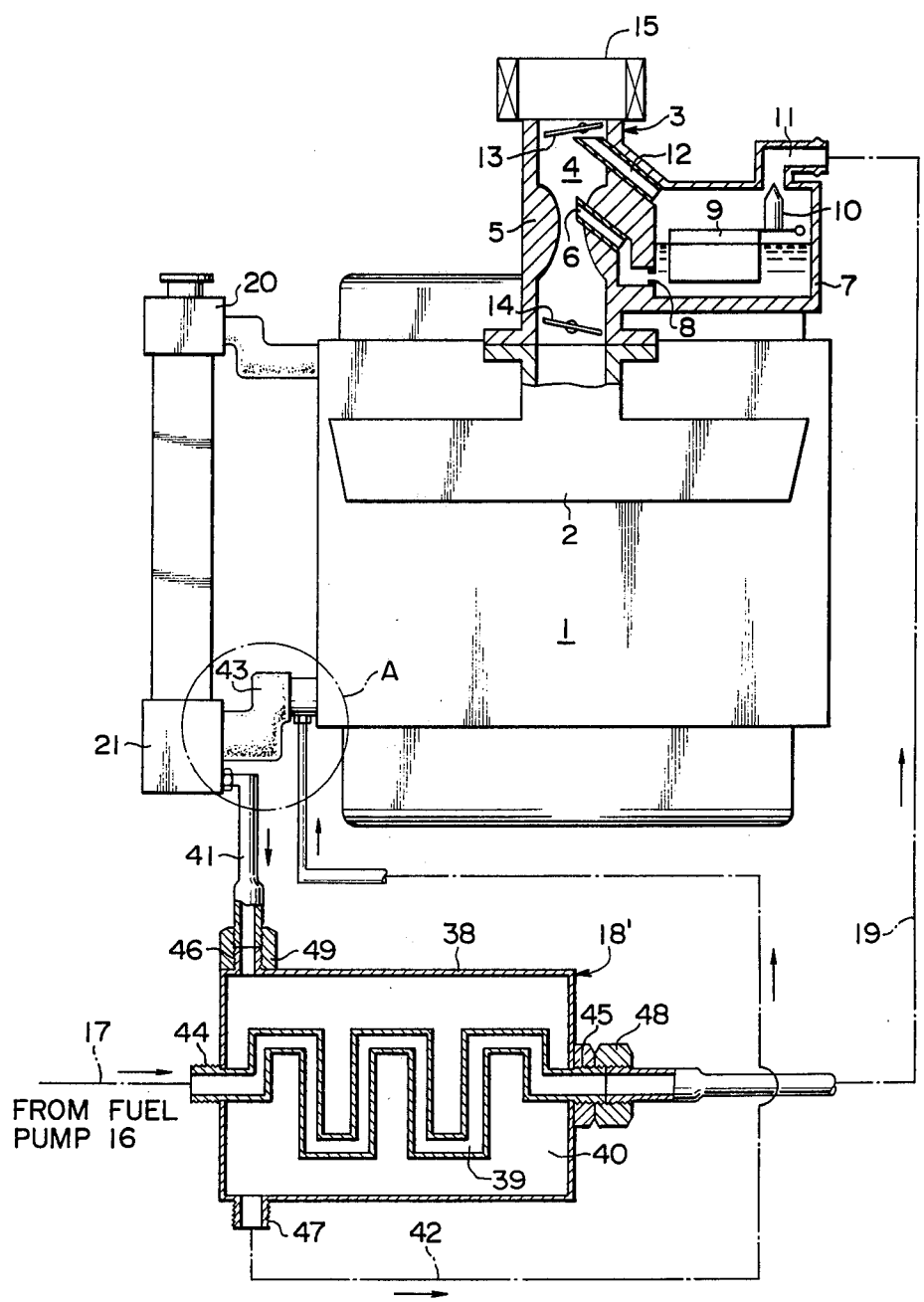

FIG. 2 is a diagrammatical view showing another embodiment of this invention. In FIG. 2, the structure regarding the engine 1, the intake manifold 2 and the carburetor 3 are similar to those shown in FIG. 1 and, therefore, repetition of a detailed description thereof will be omitted by applying corresponding reference numerals to corresponding portions. In this embodiment, fuel to be supplied to the fuel inlet 11 of the carburetor from a fuel pump, which may be the pump 16 in FIG. 1, is passed through a heating portion constituted as an independent heat exchanger 18' separated from the radiator bottom tank 21. The heat exchanger comprises a vessel-like housing 38 and a meandering tube 39 mounted therein thereby defining a water chamber 40 formed between the housing and the meandering tube. The chamber 40 is supplied with engine cooling water from the radiator bottom tank 21 through a conduit 41, said engine cooling water filling the water chamber 40 thereby heating fuel flowing through the meandering tube 39 and thereafter being discharged through a conduit 42 to be returned to an end portion of an engine cooling water return conduit 43 which connects the radiator and a cylinder block. The heat exchanger 18' comprises a fuel inlet 44, fuel outlet 45, heating water or engine cooling water inlet 46 and heating water outlet 47 of a stud type, each being connected with fuel conduits 17, 19 and engine cooling water conduits 41, 42 by means of tube connecting lock nuts 48, 49, etc.

Figure 3:
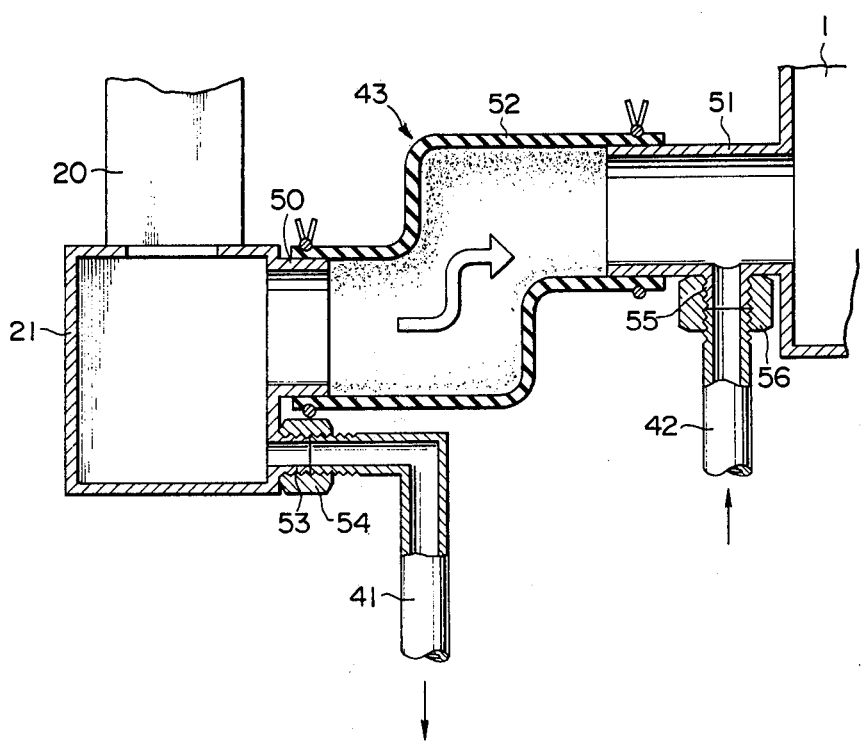
FIG. 3 is a sectional view showing the detail of portion A in FIG. 2.

FIG. 3 is a sectional view showing the detail of part A in FIG. 2. The conduit 43 which connects the radiator bottom tank 21 to the cylinder block has a structure comprising a stud tube 50 formed at the bottom tank 21, a stud 51 formed at the cylinder block and a rubber hose 52 extending between said stud tubes 50 and 51. For taking out engine cooling water for the purpose of heating the heat exchanger 18' according to this invention, a threaded stud tube 53 may be provided at a proper portion of the bottom tank 21, said stud tube being connected with a correspondingly threaded end of the conduit 41 by a tube connecting lock nut 54. Similarly, for the connection of a return end of the conduit 42 to the end portion of the conduit 43, the stud tube 51 extended from the cylinder block is provided with a threaded stud tube 55 which is connected with a correspondingly threaded end of the conduit 42 by means of a tube connecting lock nut 56.

Although this invention has been described and illustrated in the form of two embodiments, it will be easily accomplished by those skilled in the art to put a part of the full supply tube into contact with engine cooling water, especially the engine cooling water which has left the radiator, in a heat exchanging manner in other various embodiments without departing from the spirit of this invention.

I claim:
1. In an internal combustion engine which includes an isothermal fuel supply system which incorporates the engine's cooling water circulating system including the engine's radiator which contains a bottom tank portion located at its exit portion, said system further including a fuel pump, a fuel supply tube, and a carburetor or fuel injection device, said fuel supply tube extending from the fuel pump to the carburetor or the fuel injection device, the improvement which comprises providing a substantial length of said fuel supply tube to extend through said bottom tank portion of the radiator in direct heat exchange contact with the cooling water in said tank portion.

* * * * *